Ridge. & Estell,
Button.
No. 49,789.    Patented Sep. 5, 1865.
Fig. 1.
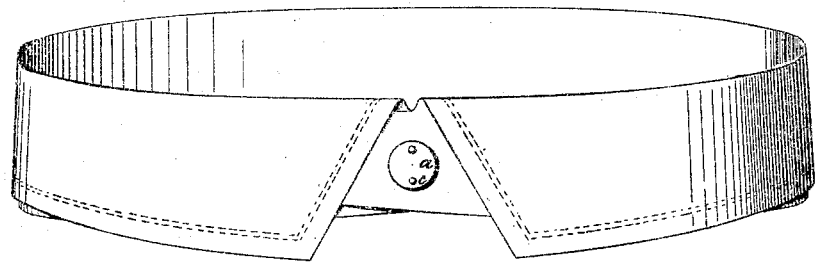
Fig. 2.      Fig. 3.      Fig. 4.
  
Witnesses.                Joseph Ridge and Sam.l F. Estell
                          By attorney A. B. Stoughton

UNITED STATES PATENT OFFICE.

JOSEPH RIDGE AND SAML. F. ESTELL, OF RICHMOND, INDIANA.

IMPROVEMENT IN SHIRT-COLLAR STUDS.

Specification forming part of Letters Patent No. 49,789, dated September 5, 1865.

*To all whom it may concern:*

Be it known that we, JOSEPH RIDGE and SAMUEL F. ESTELL, of Richmond, in the county of Wayne and State of Indiana, have invented certain new and useful Improvements in Studs for Fastening Shirt-Collars, Bosoms, Waistbands, or any other Wearing-Apparel; and we do hereby declare that the following is a full, clear, and exact description of the same, reference being had to the accompanying drawings, making a part of this specification, in which—

Figure 1 represents a shirt-collar, with the stud or fastening therein. Fig. 2 represents one of the positions in which the stud or fastening is put preparatory to inserting it in or removing it from the button-holes. Fig. 3 represents the position of the stud when it is passed through the button-hole and before it is locked or fastened therein; and Fig. 4 represents a rear view of the stud in one of its positions to show the pivoted and hinged connection of the face or locking portion thereof.

Similar letters of reference, where they occur in the several figures, represent like parts of the stud or fastening in all the drawings.

In fastening shirt-collars, and more particularly those made of paper, wherein the button-holes are punched out and there is an entire want of elasticity in the material, it is difficult to keep a fastening in its place.

Our object and purpose is to form a simple, cheap, and efficient fastening for this purpose, and thus avoid the annoyances heretofore incident to the fastenings hitherto used; and our fastening may be made highly ornamental, if so desired.

Our invention consists, first, in hinging and pivoting the face-plate to the stud, so that to insert it or to remove it from the collar or other garment said face-plate may be moved around on its pivot and then turned up on its hinge, in which position it is readily placed in or removed from the button-holes, and when turned down and around locks the fastening in place; and it further consists in so arranging the long diameters of the shank that enters the button-holes and of the rear button as that the shank shall prevent the stud from turning and allowing the rear button to come out of its button-hole.

To enable others skilled in the art to make and use our invention, we will proceed to describe the same with reference to the drawings.

When the fastening is in place its appearance is like that shown at $a$, Fig. 1. To remove it from the collar the plate $a$ is swung around on its pivot-pin $c$ until in the position shown in Fig. 2. It is then turned upward on its hinge $e$ until it assumes the position shown in Fig. 3, in which position it is easily removed or the ends of the collar removed from it; and in this same position the ends of the collar may be slipped over the plate and onto the shank $i$, and then by reversing the operation lock the fastening in place. The shank $i$ nearly fills the punched holes in the collar, or so much so as to prevent the stud from turning when in place, and the rear button, $n$, which is made of an oval form, (and united by a shank, $o$, of the ordinary construction,) may have its long diameter at right angles to the length of the shank $i$, and thus the shank will prevent the rear button from turning and hold it fast to the shirt-neckband.

$r$ is a plate between the shanks $i$ and $o$.

Having thus described our invention, what we claim is—

1. Pivoting the face-plate to the under portion of the fastening, so that it may be swung around to expose the shank or lock the ends of the collar, substantially as described and represented.

2. The combined pivoting and hinging of the face-plate to the shank or under plate, so that it may be swung around on its pivot and then raised up on its hinge for readily removing or replacing the stud and locking it when in place, substantially as described.

3. In combination with a shank that will fill, or nearly so, the button-holes of the collar or other garment, the arranging of the long diameter of the back button at right angles to the line of length of said shank, so that the shank shall prevent the stud from turning and thus allow the back button to come out of its button-hole, substantially as described.

JOSEPH RIDGE.
SAMUEL F. ESTELL.

Witnesses to signature of Joseph Ridge:
A. B. STOUGHTON,
C. F. CLAUSEN.

Witnesses to signature Samuel F. Estell:
A. L. STUDY,
H. B. PAYNE.